United States Patent
Russo et al.

Patent Number: 5,527,364
Date of Patent: Jun. 18, 1996

[54] FUEL ADDITIVE AND MOTOR FUEL COMPOSITION

[75] Inventors: Joseph M. Russo, Poughkeepsie, N.Y.; Thomas F. DeRosa, Passaic, N.J.; Benjamin J. Kaufman, Hopewell Junction, N.Y.

[73] Assignee: Texaco Inc., White Plains, N.Y.

[21] Appl. No.: 509,376

[22] Filed: Jul. 31, 1995

[51] Int. Cl.$^6$ .................... C10L 1/18; C10L 1/22
[52] U.S. Cl. .................... 44/349.000; 44/351.000; 44/418.000; 44/419; 549/266.000; 549/273.000; 549/320.000; 549/295
[58] Field of Search .................... 44/351, 349, 418, 44/419; 549/266, 273, 295, 320

[56] References Cited

U.S. PATENT DOCUMENTS

| | | | |
|---|---|---|---|
| 4,234,321 | 11/1980 | Lilburn | 44/72 |
| 4,357,148 | 11/1982 | Graiff | 44/62 |
| 4,581,040 | 4/1986 | Sung et al. | 44/71 |
| 4,604,103 | 8/1986 | Campbell | 44/72 |
| 4,631,069 | 12/1986 | Sung | 44/56 |
| 4,643,738 | 2/1987 | Sung et al. | 44/63 |
| 4,659,336 | 4/1987 | Sung et al. | 44/62 |
| 4,659,337 | 4/1987 | Sung et al. | 44/63 |
| 4,747,851 | 5/1988 | Sung | 44/72 |
| 5,203,879 | 4/1993 | Su et al. | 44/419 |
| 5,234,478 | 8/1993 | Su et al. | 44/419 |
| 5,286,264 | 2/1994 | Russo et al. | 44/419 |
| 5,332,407 | 7/1994 | Herbstman | 44/419 |

FOREIGN PATENT DOCUMENTS 297996  10/1993  European Pat. Off. .......... C10L 1/22

*Primary Examiner*—Jacqueline V. Howard
*Attorney, Agent, or Firm*—Kenneth R. Priem; Richard A. Morgan

[57] ABSTRACT

An alkylphenoxypolyoxyalkylene amine lactone composition obtained by reacting:

(a) a lactone represented by the formula:

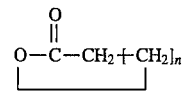

where n is a number between about 1 and about 5; and (b) an alkylphenoxypolyoxyalkylene amine represented by the formula:

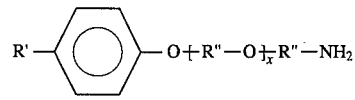

in which R' is a hydrocarbyl radical having from about 4 to 30 carbon atoms, x represents a number from about 5 to 50, and R" represents a $C_2$–$C_5$ hydrocarbyl radical or any combination of $C_2$–$C_5$ hydrocarbyl radicals, such that the oxyalkylene radical can comprise any combination of repeating $C_2$–$C_5$ oxyalkylene units to form block or random copolymers.

16 Claims, No Drawings

FUEL ADDITIVE AND MOTOR FUEL COMPOSITION

BACKGROUND OF THE INVENTION

1. Field of the Invention

This invention relates to a novel additive composition for use in motor fuels. The additive comprises the reaction product obtained by reacting a lactone with an alkylphenoxypolyoxyalkylene amine to produce a motor fuel-soluble alkylphenoxypolyoxyalkylene amine lactone compound which provides a number of valuable properties in a motor fuel composition.

The combustion of a hydrocarbon motor fuel in an internal combustion engine leads to the formation and accumulation of deposits on various parts of the combustion chamber as well as on the fuel intake and exhaust system of the engine. The presence of deposits in the combustion chamber seriously reduces the operating efficiency of the engine. First, deposit accumulation within the combustion chamber inhibits heat transfer between the chamber and the engine cooling system. This leads to higher temperatures within the combustion chamber, resulting in increases in the end gas temperature of the incoming charge. Consequently, end gas auto-ignition occurs causing engine knock. In addition, the accumulation of deposits within the combustion chamber reduces the volume of the combustion zone, causing a higher than design compression ratio in the engine. This, in turn, can also lead to engine knocking. A knocking engine does not effectively utilize the energy of combustion. Moreover, a prolonged period of engine knocking can cause stress fatigue and wear in pistons, connecting rods, bearings and cam rods of the engine. The phenomenon noted is characteristic of gasoline powered internal combustion engines. It may be overcome by employing a higher octane gasoline which resists knocking for powering the engine. This need for a higher octane gasoline as mileage accumulates has become known as the engine octane requirement increase (ORI) phenomenon. It is particularly advantageous if engine ORI can be substantially reduced or eliminated by preventing or modifying deposit formation in the combustion chambers of the engine.

Another problem common to internal combustion engines is the formation of intake valve deposits. Intake valve deposits interfere with valve closing and eventually will lead to valve burning. Such deposits interfere with valve motion and valve seating and tend to reduce the volumetric efficiency of the engine and to limit the maximum design power. Valve deposits may be produced from thermally and oxidatively unstable fuel or from lubricating oil oxidation products. The hard carbonaceous deposits produced collect in the tubes and runners that are part of the exhaust gas recirculation (EGR) flow. These deposits are believed to be formed from exhaust particles which are subjected to rapid cooling while mixing with the air-fuel mixture. Reduced EGR flow can result in engine knock and in nitric oxide, $NO_x$, emission increases. It would therefore be desirable to provide a motor fuel composition which minimizes or overcomes the formation of intake valve deposits.

An object of this invention is to provide a novel additive reaction product which may be employed in fuel compositions and particularly in a motor fuel composition.

Another object is to provide a fuel additive reaction product and a motor fuel composition which inhibits the formation of intake valve deposits in an internal combustion engine.

Another object of this invention is to provide a fuel additive and a fuel composition which inhibits or reduces the formation of combustion chamber deposits in an internal combustion engine.

Yet another object of this invention is to provide a concentrate composition which may be added to a motor fuel to provide motor fuel compositions of the instant invention.

SUMMARY OF THE INVENTION

The intake valve and combustion chamber deposit-inhibiting additive of the invention is the reaction product prepared by reacting a lactone with an alkylphenoxypolyoxyalkylene amine. The lactone reactant used to prepare the reaction product additive of the instant invention may be represented by the formula:

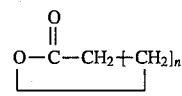

where n is a number between about 1 and about 5.

The alkylphenoxypolyoxyalkylene amine reactant may be represented by the formula:

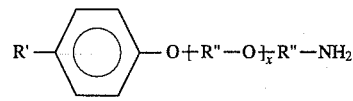

in which R' is a hydrocarbyl radical having from about 4 to 30 carbon atoms, x represents a number from about 5 to 50, and R" represents a $C_2$–$C_5$ hydrocarbyl radical or any combination of $C_2$–$C_5$ hydrocarbyl radicals, such that the oxyalkylene radical can comprise any combination of repeating $C_2$–$C_5$ oxyalkylene units to form block or random copolymers. R" can be straight or branched and is saturated.

The final reaction product may be represented by the formula:

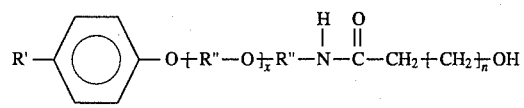

which R, R', R", x and n have the values noted above.

The motor fuel composition of the invention comprises a mixture of hydrocarbons in the gasoline boiling range and a minor amount of the prescribed intake valve and combustion chamber deposit-inhibiting additive of the invention.

DETAILED DESCRIPTION OF THE INVENTION

The intake valve and combustion chamber deposit-inhibiting additive of the invention is the reaction product of a lactone and an alkylphenoxypolyoxyalkylene amine. The lactones used to prepare the reaction product additive of the instant invention may be represented by the formula:

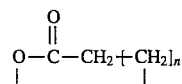

where n is a number from 1 to 5. Preferably n=2–3.

Lactones are prepared by heating the corresponding hydroxyacid so that cyclization occurs. The reaction is depicted by the following formulae:

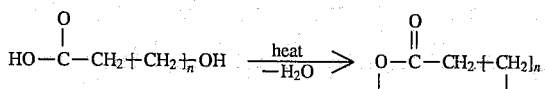

An advantage of using lactones rather than the hydroxyacids is that the lactones are considerably more electrophilic than the corresponding hydroxyacid so that higher product yield are obtained as a result of the favorable reaction kinetics.

The alkylphenoxypolyoxyalkylene amine reactant is represented by the formula:

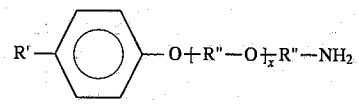

in which R' is a hydrocarbyl radical having from about 4 to 30 carbon atoms, x represents a number from about 5 to 50, and R" represents a $C_2$–$C_5$ hydrocarbyl radical or any combination of $C_2$–$C_5$ hydrocarbyl radicals, such that the oxyalkylene radical can comprise any combination of repeating $C_2$–$C_5$ oxyalkylene units to form block or random copolymers. Preferably, R' represents a monovalent aliphatic radical having from about 6 to 24 carbon atoms, and more preferably an aliphatic radical having from about 8 to 20 carbon atoms. A particularly preferred value for R' is from 9 to 18 carbon atoms. A preferred value for x is from about 6 to 30, with the most preferred value being from about 10 to 20. Preferably R" is a $C_3$, $C_4$ or mixture thereof.

The lactone reactant and the alkylphenoxypolyoxyalkylene amine reactant are reacted in about a 1:1 mole ratio at a temperature of about 80° C. to about 120° C. for about 2 hours. While other mole ratios are contemplated, no significant advantage is realized in departing from about equimolar reaction ratios.

The additive reaction product of the invention may be represented by the formula:

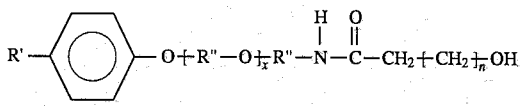

in which R, R', R", x and n have the values noted above.

The motor fuel composition of the present invention comprises a major portion of a hydrocarbon fuel boiling in the gasoline range between 90° F. and about 370° F., and a minor portion of the additive composition of the present invention sufficient to reduce the formation of intake valve and combustion chamber deposits.

Preferred base motor fuel compositions are those intended for use in spark ignition internal combustion engines. Such motor fuel compositions, generally referred to as gasoline base stocks, preferably comprise a mixture of hydrocarbons boiling in the gasoline boiling range, preferably from about 90° F. to about 370° F. This base fuel may consist of straight chain or branched chain paraffins, cycloparaffins, olefins, aromatic hydrocarbons, or mixtures thereof. The base fuel can be derived from, among others, straight run naphtha, polymer gasoline, natural gasoline, or from catalytically cracked or thermally cracked hydrocarbons and catalytically reformed stock. The composition and octane level of the base fuel are not critical and any conventional motor fuel base can be employed in the practice of this invention. In addition, the motor fuel composition may contain any of the additives generally employed in gasoline. Thus, the fuel composition can contain anti-knock compounds such as tetraethyl lead compounds, anti-icing additives, and the like.

The additive composition is typically added to motor fuel at a treat rate of about 50 to about 1800 pounds per thousand barrels (PTB), preferably about 75 PTB to about 1000 PTB and more preferably about 100 PTB to about 300 PTB.

The following examples illustrate the preparation of the additive of the invention.

EXAMPLE I

A. Preparation of 13.5 Mole Propylene Oxide Adduct of Nonyl Phenol

Into a 10-gallon kettle were charged 15 pounds of nonyl phenol and 226.8 grams of 45 percent aqueous potassium hydroxide. The reactor was then purged with pre-purified nitrogen. Maintaining a nitrogen purge, the reactor was heated to 110° C. and the initiator sodium hydroxide dried to a water content of less than 0.15 percent using both vacuum and nitrogen stripping. Propylene oxide (53.4 pounds) was then reacted at 110°–115° C. at 60 psig over an 8.5 hour period. The reaction mixture was then digested for two hours to an equilibrium pressure and purged with nitrogen for 15 minutes. The alkaline product was then neutralized at 95° C. by stirring for two hours with 612 grams Magnesol 30/40 adsorbent which was added in an aqueous slurry. Di-t-butyl p-cresol (9.3 grams) was then added to stabilize the product against oxidation. The neutralized product was then vacuum stripped to a minimum pressure at 110° C., nitrogen stripped, and filtered. Properties of the finished product are given in Table I below.

TABLE I

| Properties | |
| --- | --- |
| Acid no., mg KOH/g | 0.001 |
| Hydroxyl no. mg KOH/g | 59.2 |
| Unsaturation, meg/g | 0.036 |
| Water, wt. % | 0.04 |
| pH in 10:6 isopropanol-water | 8.3 |
| Color, Pt—Co | 50 |
| Sodium, ppm | 0.5 |
| Potassium, ppm | 3.5 |
| Viscosity, 77° F., μ | 123 |

B. Preparation of Nonylphenoxypolyoxypropylene Amine

To a tubular reactor filled with 1250 milliliters of a nickel catalyst was fed 1.0 lb/hr of the alcohol (Preparation A above), 1.0 lbs/hr of ammonia, and 50 L/hr of hydrogen. The reactor was at 2000 psig and 210° C. The crude reactor effluent was charged to a clean dry kettle. It was then nitrogen stripped to 75° C. then placed under vacuum and heated to 100° C. The product had the following analysis:

| | meq/gram |
| --- | --- |
| Total acetylatables | 1.09 |
| Total amine | 1.05 |
| Primary amine | 1.05 |

C. Preparation of the Reaction Product of $C_3$ Lactone and Nonylphenoxypolyoxypropylene Amine To a 2-liter, three-necked flask equipped with a thermometer, stirrer, and nitrogen outlet was charged mole of nonylphenoxypolyoxypropylene amine (Preparation B) and one mole of $C_3$ lactone. The mixture was heated to 98° C. for about 2 hours. The resulting product may be represented by the formula:

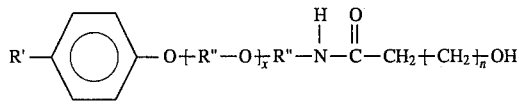

where R' is a nonyl group, R" is a propyl group, n is 3 and x is 12.5.

The additive of the invention was tested for its efficacy as an intake valve and combustion chamber detergent using the Chrysler 2.2 L Engine Test at a treat rate of 100 PTB. The unadditized base fuel is described in the following table:

| Fuel 1 | |
| --- | --- |
| API GRAVITY @ 60 F. | 57.8 |
| RVP (psi) | ND |
| Sulfur (wt %) | 0.0375 |
| Existent Gum washed mg/100 ml | 1.0 |
| Oxidation Stability minutes | ND |
| FIA | |
| Aromatic (vol %) | 35.0 |
| Olefins (vol %) | 12.0 |
| Saturates (vol %) | 53.0 |
| ASTM Distillation | |
| IBP | — |
| 5.00% | 111 |
| 10.00% | 127 |
| 20.00% | 149 |
| 30.00% | 169 |
| 40.00% | 193 |
| 50.00% | 218 |
| 60.00% | 244 |
| 70.00% | 271 |
| 80.00% | 301 |
| 90.00% | 332 |
| 95.00% | 352 |
| FBP | 403 |
| Rec % | 97.3 |
| Loss % | 1.5 |
| Res % | 1.2 |
| MTBE (vol %) | ND |
| TAME (vol %) | ND |
| ETOH (vol %) | ND |
| Benzene (vol %) | — |

Chrysler 2.2L Engine Test

The Chrysler 2.2L test engine is a port fuel injected turbo engine and is dedicated to run a two condition test cycle to evaluate combustion chamber deposit and intake valve deposit performance. The test cycle consists of two running conditions (low rpm/low engine load condition and moderate rpm/moderate load condition) cycled continuously for 90 hours. These conditions are detailed below. Each condition is run for a specified time before cycling to the next condition. The test cycle is designed to allow the engine to reach and maintain certain operating conditions for periods of time so as to differentiate additive chemistries and their ability to control deposit levels within the combustion chamber as well as on the intake valves.

| Test conditions: | | | |
| --- | --- | --- | --- |
| Chrysler 2.2 L Engine Test Conditions | | | |
| | Time (min) | Speed (rpm) | Load (ft l)b |
| Condition 1 | 6 | 1800 | 24.5 |
| Condition 2 | 12 | 2650 | 45.5 |

| Chrysler 2.2 L Engine Test Results | | | | |
| --- | --- | --- | --- | --- |
| Detergent | Piston Tip Thickness (mils) | Combustion Head Thickness (mils) | Total Thickness (mils) | Intake Valve Weight (mg) |
| Unadditized Base Fuel | 2.7 | 4.7 | 7.3 | 648 |
| Commercially Available Detergent | 3.1 | 4.7 | 7.8 | 27 |
| Amido Alkanolamine Lactone | 3.0 | 5.2 | 8.2 | 26 |

These data indicate that the efficacy of the intake valve and combustion chamber detergent of the present invention is comparable to the commercially available detergent tested.

What is claimed is:

1. An alkylphenoxypolyoxyalkylene amine lactone composition obtained by reacting:

(a) a lactone represented by the formula:

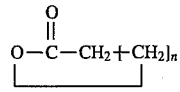

where n is a number between about 1 and about 5; and (b) an alkylphenoxypolyoxyalkylene amine represented by the formula:

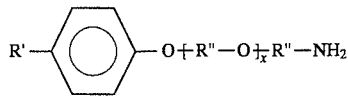

in which R' represents a hydrocarbyl radical having from 4 to 30 carbon atoms, x has a value from 5 to 50, and R" represents a saturated $C_2$–$C_5$ hydrocarbyl or any combination of $C_2$–$C_5$ hydrocarbyl radicals, such that the oxyalkylene radical can comprise any combination of repeating $C_2$–$C_5$ oxyalkylene units to form block or random copolymers.

2. The composition according to claim 1 in which R" represents a mixture of $C_3$ and $C_4$ hydrocarbyl radical.

3. The composition according to claim 1 where n is a number from 2 to about 3.

4. The composition according to claim 1 where n is 3.

5. The composition according to claim 1 in which R' represents a monovalent aliphatic radical having from 6 to 24 carbon atoms.

6. The composition according to claim 5 in which said aliphatic radical has from 8 to 20 carbon atoms.

7. The composition according to claim 1 in which x has a value from about 6 to 20.

8. A fuel composition comprising a major portion of a mixture of hydrocarbons and containing from about 50 PTB to about 1800 of an additive composition comprising the reaction product of:

(a) a lactone represented by the formula:

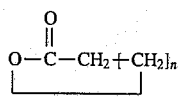

where n is a number between about 1 and about 5; and (b) an alkylphenoxypolyoxyalkylene amine represented by the formula:

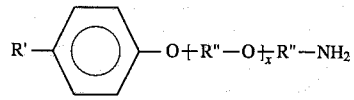

in which R' represents a hydrocarbyl radical having from 4 to 30 carbon atoms, x has a value from 5 to 50, and R" represents a $C_2$–$C_5$ hydrocarbyl or any combination of $C_2$ $C_5$ hydrocarbyl radicals, such that the oxyalkylene radical can comprise any combination of repeating $C_2$–$C_5$ oxyalkylene units to form block or random copolymers.

9. The fuel composition according to claim 8 in which the fuel is a mixture of hydrocarbons boiling in the gasoline boiling range.

10. The fuel composition according to claim 8 in which the additive composition is present in the fuel composition in an amount of about 100 PTB to about 300 PTB.

11. The composition according to claim 8 in which R" represents a mixture of $C_3$ and $C_4$ hydrocarbyl radicals.

12. The composition according to claim 8 where n is a number from 2 to about 3.

13. The composition according to claim 8 where n is 3.

14. The composition according to claim 8 in which R' represents a monovalent aliphatic radical having from 6 to 24 carbon atoms.

15. The composition according to claim 14 in which said aliphatic radical has from 8 to 20 carbon atoms.

16. The composition according to claim 8 in which x has a value from about 6 to 20.

* * * * *